(12) United States Patent
Nakamura et al.

(10) Patent No.: US 6,555,236 B1
(45) Date of Patent: Apr. 29, 2003

(54) ARTICLES HAVING AN UNEVEN SURFACE AND PRODUCTION PROCESS THEREFOR

(75) Inventors: Koichiro Nakamura, Osaka (JP); Masahiro Hori, Osaka (JP); Hiroaki Yamamoto, Osaka (JP)

(73) Assignee: Nippon Sheet Glass Company, Ltd., Osaka (JP)

(*) Notice: Subject to any disclaimer, the term of this patent is extended or adjusted under 35 U.S.C. 154(b) by 10 days.

(21) Appl. No.: 09/786,484

(22) PCT Filed: Jul. 6, 2000

(86) PCT No.: PCT/JP00/04502
§ 371 (c)(1), (2), (4) Date: Mar. 6, 2001

(87) PCT Pub. No.: WO01/03901
PCT Pub. Date: Jan. 18, 2001

(30) Foreign Application Priority Data

Jul. 7, 1999 (JP) .............................. 11-193683

(51) Int. Cl.$^7$ ................................. B32B 9/04
(52) U.S. Cl. ................ 428/447; 428/412; 428/429; 525/478; 528/21; 528/43
(58) Field of Search ................ 428/447, 429, 428/412; 427/387; 528/12, 21, 43

(56) References Cited

U.S. PATENT DOCUMENTS

| | | | |
|---|---|---|---|
| 4,242,250 A | * 12/1980 | Gagnon et al. | 260/33.4 SB |
| 4,810,547 A | 3/1989 | Minami et al. | |
| 5,498,445 A | 3/1996 | Steiner et al. | |
| 5,773,126 A | 6/1998 | Noritake et al. | |

FOREIGN PATENT DOCUMENTS

| | | |
|---|---|---|
| EP | 603 274 | 6/1994 |
| JP | 62102445 | 5/1987 |
| JP | 6349702 | 3/1988 |
| JP | 6242303 | 9/1994 |
| JP | 7-235075 | 9/1995 |
| JP | 9-77509 | 3/1997 |
| JP | 10-13345 | 1/1998 |

OTHER PUBLICATIONS

Matsuda et al., "Fine Patterning and Characterization of Gel Films Derived from Methyltriethoxysilane and Tetraethoxysilane," 1998, Journal of the American Ceramic Society, 81(11) 2849–2852.*
Patent Abstracts of Japan, vol. 1998, No. 2, Jan. 30, 1998—Abstract of JP 09–278901A—Oct. 28, 1997.
Patent Abstracts of Japan, vol. 1996, No. 11, Nov. 29, 1996—Abstract of JP 08–188649—Jul. 23, 1996.
Patent Abstracts of Japan, vol. 1997, No. 4, Apr. 30, 1997—Abstract of JP 08–319422—Dec. 3, 1996.
Atsunori Matsuda, et al., J. Am. Ceram. Soc., vol. 81, No. 11, pp. 2849 to 2852 (1998).

* cited by examiner

Primary Examiner—Robert Dawson
Assistant Examiner—Christopher M. Keehan
(74) Attorney, Agent, or Firm—Wenderoth, Lind & Ponack, L.L.P.

(57) ABSTRACT

A process for producing an article having a fine uneven surface, coated with a film which has high heat resistance, does not crack and does not peel off from a substrate. The process for producing the article comprises disposing a film-forming solution between a substrate and a mold in the form of a film so as to make the solution closely contact with the substrate and the mold, said solution being prepared by carrying out the hydrolysis and dehydration polycondensation reaction of a stock solution containing a specific silane compound (A) having an unhydrolyzable organic group and a hydrolyzable group, a specific silane compound (B) having a hydrolyzable group and a catalyst, and heating to form an article having an uneven film having a surface shape which is the inversion of the surface shape of the mold on the surface of the substrate. The film-forming solution contains the above silane compounds (A) and (B) in the form of unhydrolysates in amounts of 0.5 to 40 wt % and 0.5 to 60 wt % based on the amount of the above silane compound (A) and the amount of the above silane compound (B) contained in the stock solution, respectively. A condensate formed by the dehydration condensation reaction of the film-forming solution has a molecular weight of 300 to 1,900.

15 Claims, 1 Drawing Sheet

ARTICLES HAVING AN UNEVEN SURFACE AND PRODUCTION PROCESS THEREFOR

FIELD OF THE INVENTION

The present invention relates to articles having a fine uneven structure on the surface, particularly optical microelements and information recording medium substrates, to a production process.therefor and to a composition therefor.

DESCRIPTION OF THE PRIOR ART

Optical parts such as a diffraction optical element, Fresnel lens and flat microlens (an.array of a large number of microlenses arranged in parallel on a plate), CD-ROM and other information recording media have a fine uneven structure on the surface. This fine uneven structure on the surface serves as a diffraction grating or microlens to converge or diffuse light in optical articles or serves as a pit or tracking guide in an information recording medium.

To form this fine uneven structure on the surface, there are known the following conventional processes (1) to (4).

(1) JP-A 63-49702 (the term "JP-A" as used herein means an "unexamined published Japanese patent application") discloses a process in which an ultraviolet curable resin is uniformly spread over a substrate and irradiated with ultraviolet light while a mold having an uneven portion is pressed against the resin.

(2) JP-A 62-102445 discloses a process in which an uneven portion is formed in accordance with a so-called sol-gel method by coating a glass substrate with a solution containing silicon alkoxide and heating while a mold having an uneven portion is pressed.

(3) JP-A 6-242303 discloses a process in which a plurality of layers having a thickness of several micrometers are formed on a substrate by a sol-gel method. In this case, the constituent components of each layer are prepared in the form of a solution or sol and heated while a mold is pressed, and then a solution or sol is poured onto the completely solidified layer to form an upper layer.

(4) J. Am. Ceram. Soc. Vol. 81, No. 11, pp. 2849 and 2852 (1998) discloses a process for producing an optical disk having a fine groove structure by coating a substrate with a solution containing methyltriethoxysilane and tetraethoxysilane.

However, the above prior arts have the following problems. First, in the above process (1), the ultraviolet curable resin decomposes or yellows at a temperature of 250° C. or more due to its low heat resistance. Therefore, a substrate having an uneven portion of an ultraviolet curable resin cannot be subjected to a heat treatment such as soldering and it is difficult to install the substrate in an apparatus.

In contrast to this, the uneven portion of silicone alkoxide formed by the sol-gel method in the process (2) has high heat resistance and can be soldered. However, this sol-gel method involves such a problem that a thick film cannot be formed. When a silicon alkoxide layer having a thickness of several micrometers is formed by this sol-gel method in fact, a fine crack is formed on the surface. This is because large stress is generated on the surface due to a difference in the progress of a polycondensation reaction between the surface and the interior of the layer when the silicon alkoxide solution is gelled and solidified. Further, this stress may cause the layer to peel off from the substrate.

The above process (3) is a process for forming a plurality of organopolysiloxane layers sequentially, which is capable of forming an organopolysiloxane layer having an uneven surface and a thickness-of several tens of microns. However, the production process takes long, thereby boosting costs. Further, as a solution for forming the next layer is poured after the underlying layer is completely cured, unnecessary air is easily contained between the mold and the solution or sol, thereby reducing the dimensional accuracy of the uneven portion.

Further, the above process (4) is capable of producing an optical disk whose sol-gel film has a maximum thickness smaller than 300 nm. However, this process involves such a problem that a film is cracked when the film is heated at a temperature required for soldering, for example, 350° C. and then cooled to form a diffraction optical element having a film thickness of 500 nm to several micrometers, for example.

SUMMARY OF THE INVENTION

It is an object of the present invention which has been made in view of the above problems, of the prior art to provide a process for producing an article having a fine uneven surface which has high heat resistance, does not crack even when it is a single layer film having a thickness of 500 nm (0.5 μm) to several micrometers, does not peel off from a substrate and has high dimensional accuracy.

It is another object of the present invention to provide articles having an uneven surface produced by the process of the present invention.

Other objects and advantages of the present invention will become apparent from the following description.

Firstly, according to the present invention, the above objects and advantages of the present invention are attained by a process for producing an article having an uneven surface, comprising disposing a film-forming solution between a substrate and a mold in the form of a film so as to make the solution closely contact with the substrate and the mold, said solution being prepared by carrying out the hydrolysis and dehydration condensation reaction of a stock solution containing a silane compound (A) represented by the following chemical formula (1):

$$RSiX_3 \tag{1}$$

wherein R is a non-hydrolyzable organic group and X is a hydrolyzable group, a silane compound (B) represented by the following chemical formula (2):

$$SiX'_4 \tag{2}$$

wherein X' is a hydrolyzable group, and a catalyst, and heating to form an article having an article having an uneven film having a surface shape which is the inversion of the surface shape of the mold on the surface of the substrate, wherein
the film-forming solution contains the silane compounds (A) and (B) in the form of unydrolyzates in amounts of 0.5 to 40 wt % and 0.5 to. 60 wt % based on the amount of the silane compound (A) and the amount of the silane compound (B) contained in the stock solution, respectively, and a condensate produced by the dehydration condensation reaction in the film-forming solution has a molecular weight of 300 to 1,900.

DETAILED DESCRIPTION OF THE INVENTION

In the present invention, in the silane compound (A) represented by the above chemical formula (1) contained in the stock solution before it is subjected to hydrolysis and dehydration condensation to become the film-forming solution, R is a non-hydrolyzable organic group such as alkyl, phenyl, vinyl, N-(2-aminoethyl) 3-aminopropyl, 3-aminopropyl, 3-glycidoxypropyl, 2-(3,4-epoxycyclohexyl)ethyl, 3-chloropropylmethyl, 3-chloropropyl, 3-methacryloxypropyl, 3-mercaptopropyl or N-[2-(vinylbenzylamino)ethyl]-3-aminopropyl. X is a hydrolyzable group such as an alkoxyl group or halogen atom. The above alkyl group represented by R may be linear or branched, preferably an alkyl group having 1 to 3 carbon atoms. The above alkoxyl group represented by X may be linear or branched, preferably an alkoxyl group having 1 to 4 carbon atoms, particularly preferably an alkoxyl group having 1 to 2 carbon atoms. The above halogen atom represented by X is fluorine, chlorine or bromine, particularly preferably chlorine. When the article having an uneven surface of the present invention is located in close vicinity to a memory or other electronic circuit, if chlorine is contained in the article of the present invention, it may shorten the service life of the electronic circuit. Therefore, an alkoxyl group is preferred as X.

In the silane compound (B) represented by the above chemical formula (2) and contained in the above stock solution, X' is a hydrolyzable group such as an alkoxyl group or halogen atom. The four X's do not need to be the same group and may be each independently different groups. The alkoxyl group represented by X' may be linear or branched, preferably an alkoxyl group having 1 to 4 carbon atoms, particularly preferably an alkoxyl group having 1 to 2 carbon atoms. The halogen atom represented by X' is fluorine, chlorine or bromine, particularly preferably chlorine. When the article having an uneven surface of the present invention is located in close vicinity to a memory or other electronic circuit, if chlorine is contained in the article of the present invention, it may shorten the service life of the electronic circuit. Therefore, an alkoxyl group is preferred as X'.

Illustrative examples of the silane compound (A) represented by the chemical formula (1) include methyltriethoxysilane, ethyltriethoxysilane, propyltriethoxysilane, butyltriethoxysilane, hexyltriethoxysilane, octyltriethoxysilane, methyltrimethoxysilane, ethyltrimethoxysilane, propyltrimethoxysilane, butyltrimethoxysilane, hexyltrimethoxysilane, octyltrimethoxysilane methyltrichlorosilane, ethyltrichlorosilane, propyltrichlorosilane, butyltrichlorosilane, hexyltrichlorosilane, octyltrichlorosilane, methyltribromosilane, ethyltribromosilane, propyltribromosilane, butyltribromosilane, hexyltribromosilane, octyltribromosilane, vinyltrimethoxysilane, vinyltriethoxysilane, N-(2-aminoethyl)3-aminopropylmethyl dimethoxysilane, N-(2-aminoethyl)3-aminopropyl trimethoxysilane, 3-aminopropyltriethoxysilane, 3-aminopropyltrimethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimiethoxysilane, 3-mercaptopropyltrimethoxysilane and N-[2-(vinylbenzylamino)ethyl]-3-aminopropyl trimethoxysilane. Out of these, silane compounds (A) having an alkyl group with 1 to 3 carbon atoms and an alkoxyl group with 1 to 2 carbon atoms, that is, methyltrimethoxysilane, ethyltrimethoxysilane, propyltrimethoxysilane, methyltriethoxysilane, ethyltriethoxysilane and propyltriethoxysilane are particularly preferred because an alcohol formed by a hydrolytic reaction is easily evaporated.

Illustrative examples of the silane compound (B) represented by the above chemical formula (2) include tetramethoxysilane, tetraethoxysilane, tetrapropoxysilane, tetrabutoxysilane, tetrachlorosilane, trichloromethoxysilane, trichloroethoxysilane, dichlorodimethoxysilane, dichlorodiethoxysilane and monochlorotrimethoxysilane. Out of these, silane compounds having a relatively small molecular weight, such as tetraalkoxysilanes having an alkoxyl group with 1 to 2 carbon atoms exemplified by tetramethoxysilane and tetraethoxysilane, are preferred because an alcohol formed by a hydrolytic reaction is easily evaporated and a fine film is easily formed.

The above stock solution preferably contains the silane compound (A) represented by the above chemical formula (1) and the silane compound (B) represented by the above chemical formula (2) in a (B)/(A) molar ratio of 0.05/1 to 1/1.

The above stock solution includes a solution prepared by substituting part or all of the above component (B) by a silane compound (C) represented by the following chemical formula (3):

(3)

wherein X" is a hydrolyzable alkoxyl group or halogen atom, and n is an integer of 1 to 10, preferably 1 to 5, in an amount of 1/(n+1) mol based on 1 mol of the above component (B).

The silane compound (C) represented by the above formula (3) is a partly hydrolyzed condensate of the silane compound (B) represented by the above formula (2). Illustrative examples of the silane compound (C) include hexaethoxydisiloxane (n=1), octaethoxytrisiloxane (n=2), decaethoxytetrasiloxane (n=3) and ethoxypolysiloxane (n≧4). Ethyl Silicate 40 (trade name, manufactured by Colcoat Co., Ltd.) (whose composition is described in J. Cihlar's document, Colloids and Surfaces A: Physicochem. Eng. Aspects 70 (1993) at pages 253 to 268, weight percentage of monomer: 12.8 wt %, dimer: 10.2 wt %, trimer: 12.0 wt %, tetramer: 7.0 wt %, polymer (n≧4): 56.2 wt %, ethanol: 1.8 wt %) which comprises a mixture of a monomer (n=0) and a condensate (n≧1) is advantageously used.

In the present invention, the film-forming solution is prepared by carrying out the hydrolysis and dehydration condensation of the above stock solution which contains the above components (A) and (B) and a catalyst and applied to a substrate to form a film in the end which contains an appropriate amount of the residual non-hydrolyzable organic group such as an alkyl group of the component (A). Since the alkyl group serves to provide elasticity to a film by reducing the fragility of the film, it can suppress thermal stress generated in the interior of the film, thereby preventing the cracking of the film and the film from peeling off from the substrate of the article.

For convenience's sake, a case where alkyltrialkoxysilane is used as the component (A) and tetraalkoxysilane is used as the component (B) will be described hereinafter.

It is presumed that as trialkoxysilane and tetraalkoxysilane are used in admixture in the film according to the present invention, a trifunctional silane having an alkyl group and a tetrafunctional silane having no alkyl group are bonded together three-dimensionally, whereby room is formed in the three-dimensional skeleton by the alkyl group and this film structure provides elasticity to the film and reduces the fragility of the film, thereby making it possible to form a thick film.

Since the film according to the present invention contains an alkylsilyl group, the skeleton structure of an oxide in the film is made bulky to suppress the fragility of the film in order to provide elasticity and also stability at high temperatures to the film.

A description is subsequently given of the hydrolysis and dehydration condensation reaction between the components (A) and (B) of the present invention. If the degree of the hydrolytic reaction between the components (A) and (B) of the present invention is too low, a large amount of alkoxyl group will remain in the film-forming solution after the dehydration condensation reaction, shrinkage will occur when a gelled film is obtained by adhering this film-forming solution between the substrate and the mold, disposing the solution in the form of a film and heating, thereby reducing dimensional accuracy, and the film will peel off or crack when the gelled film is then heated at a temperature higher than 300° C. and cooled. If a large amount of alkoxyl group remains in the film-forming solution at the time of coating a glass substrate, the affinity of the film-forming solution for the surface of the substrate will deteriorate, thereby causing such a phenomenon that the film-forming solution is repelled from the surface of the substrate. On the other hand, if the rate of hydrolysis is too high, the subsequent dehydration condensation reaction will proceed more than required, whereby the molecular weights of a condensate of the component (A) and a condensate of the component (B) contained in the film-forming solution will become too large, thereby forming separate phases of the component (A) or/and the component (B) in the film. Thereby, the film easily peels off in the molding step, or the film easily cracks due to the formation of a portion having a different shrinkage factor in the interior of the film when the film is heated at a temperature higher than 300° C. and then cooled. If the amount of the residual alkoxyl group in the film-forming solution is too small due to the too high degree of the hydrolytic reaction between the components (A) and (B), the obtained film will crack owing to insufficient elasticity. The film-forming solution obtained by the hydrolysis and dehydration condensation reaction between the components (A) and (B) contained in the stock solution contains the condensate of the component (A), the condensate of the component (B), the co-condensate of the components (A) and (B), the hydrolysate of the component (A), the hydrolysate of the component (B), and the components (A) and (B) in the form of unhydrolysates. The film-forming solution contains the silane compound (A) in the form of an unhydrolysate in an amount of preferably 0.5 to 40 wt %, more preferably 2 to 30 wt % based on the amount of the silane compound (A) contained in the stock solution and the silane compound (B) in the form of an unhydrolysate in an amount of preferably 0.5 to 60 wt %, more preferably 3 to 55 wt % based on the amount of the silane compound (B) contained in the stock solution. The amounts of the residual unhydrolysates contained in the solution for forming a film can be measured by gas chromatography, and the proportion of unhydrolysates (unhydrolyzability) contained in the film-forming solution can be calculated from the amounts of the silane compounds (A) and (B) contained in the stock solution and the above amounts of the residual unhydrolysates.

A description is subsequently given of the degree of the dehydration condensation reaction between the components (A) and (B) of the present invention. If the molecular weight of a condensate formed in the film-forming solution by the hydrolysis and dehydration condensation reaction of the raw material components of the present invention is too large, the viscosity of the solution may rise markedly, the thickness of a coating film at the time of coating may become nonuniform, and the surface of the formed film may crack due to a difference in shrinkage at the time of heating and then cooling. Further, the homogeneity of a mixture of the components (A) and (B) may deteriorate. If the dehydration condensation reaction proceeds too far, the number of OH groups of hydrolysates of the components (A) and (B) having high affinity for the surface of a glass substrate will become small, thereby causing the peeling off of the film. Therefore, the condensate contained in the film-forming solution preferably has a weight average molecular weight of 300 to 1,900.

As for the ratio of the component (A) to the component (B) in the stock solution (and the film-forming solution), when the component (B) is too smaller in quantity than the component (A), adhesion between the film and the substrate deteriorates and the film easily peels off at the time of final heating (baking) or after a durability test. When the component (B) is too larger in quantity than the component (A), the flexibility of the film is impaired, whereby the film having a thickness of 0.5 μm or more easily cracks at the time of final heating or cooling after final heating. Therefore, as described above, the above stock solution contains the component (B) in an amount of preferably 0.05 to 1 mol, more preferably 0.05 to 0.5 mol, much more preferably 0.05 to 0.1 mol based on 1 mol of the component (A). When part or all of the component (B) is substituted by the component (C) (polymerization degree M=n+1, n is the same as in the above formula (3)), for example, when all of the component (B) is substituted by the component (C), the stock solution contains the component (C) in an amount.of preferably (0.05/M to 1/M) mol, more preferably (0.05/M to 0.5/M) mol, much more preferably (0.05/M to 0.1/M) mol based on 1 mol of the component (A).

The stock solution which is the raw material of a sol-gel material in the present invention is prepared by adding an alcohol as a solvent to a mixture of the components (A) and (B). The alcohol added is a lower alcohol having 1 to 4 carbon atoms, particularly methanol or ethanol having a low boiling point. The reason for this is that the alcohol can be removed from the solution swiftly after hydrolysis and during the molding step by a heat treatment at a relatively low temperature. The molar ratio of the alcohol to the total of the components (A) and (B) is preferably 0.3 to 5, more preferably 0.5 to 1.5.

To this stock solution is added a catalyst for hydrolyzing the components (A) and (B). The catalyst is preferably an acid catalyst. The acid catalyst is preferably used in the form of an aqueous solution containing at least one of formic acid, acetic acid, tetrafluoroacetic acid, propionic acid, oxalic acid, hydrochloric acid, nitric acid and sulfuric acid. If the amount of the acid catalyst added which differs according to the type of the acid and the strength (weak or strong acid) of protonic acid is too small, the proceeding of hydrolysis and the dehydration condensation reaction will become slow and if the amount is too large, the condensation reaction will proceed too far, the molecular weight will become too large, and the gelatin of a precipitate or coating solution will readily occur disadvantageously. To esnure that the film-forming solution should contain the silane compounds (A) and (B) in the form of unhydrolysates in amounts of 0.5 to 40 wt % and 0.5 to 60 wt % based on the amounts of the silane compounds (A) and (B) contained in the stock solution, respectively, organic acids which are weak acids out of the above acid catalysts are preferably used. Out of the organic acids, formic acid is particularly preferred because it has a small molecular weight and easily evaporates. The amount of the acid catalyst to be added is preferably 0.5 to 5 mmol, more preferably 0.7 to 2 mmol based on 1 mol of the total of the components (A) and (B) and/or (C) when formic acid is used as the acid catalyst. It is preferred to add water in an amount more than a stoichiometric amount required for hydrolysis. The reason is that when the amount of water is smaller than the stoichiometric amount, the unreacted silane compounds (A) and (B) easily evaporate during a heat treatment for gelation. The amount of water including water of the aqueous solution of the catalyst is generally 1.1 to 30 times the required stoichiometric amount and the molar ratio thereof to the total amount of the components (A) and (B) and/or (C) is preferably 2 to 20, more preferably 3 to 10. When the article having an uneven surface of the present invention is located in close vicinity to a memory or other electronic circuit, if chlorine is contained in the article of the present invention, it may shorten the service life of the electronic circuit. Therefore, an acid catalyst containing no chlorine is preferably used as the above acid catalyst.

In the present invention, the film-forming solution as the raw material of a sol-gel material is prepared by hydrolyzing both alkoxysilanes while the stock solution containing the component (A), component (B), alcohol solvent, water and catalyst is stirred at room temperature for 20 to 120 minutes to be maintained. Thereafter, a dehydration polycondensation reaction is carried out by maintaining the solution at preferably room temperature (20° C.) to 60° C., more preferably 30 to 50° C. for 1 to 20 hours. Thereby, the shrinkage of the film after formation is suppressed as much as possible to prevent the cracking of the film and a cured film can be formed without producing air bubbles in the film at the time of final heating. If the dehydration polycondensation reaction proceeds too far, the viscosity of the solution will become too high, thereby making it difficult to form the coated film on the surface of the mold or substrate. If the dehydration polycondensation reaction proceeds insufficiently, the cissing of coating solution will occur on the substrate at the time of coating, thereby making it impossible to prevent.the production of air bubbles in the film at the time of final heating. The proceeding of the dehydration polycondensation reaction is preferably controlled by selecting the temperature and retention time to ensure that the viscosity of the solution should become 10 cP or less.

In the present invention, a surfactant, leveling agent and flow control agent may be added to the solution before or after the dehydration polycondensation reaction in an amount of preferably 5% or less, more preferably 0.001 to 0.5%, much more preferably 0.001 to 0.1% based on the total weight of the coating solution. By the addition of these additives, the defects of the film at the time of coating can be improved.

The above surfactant, leveling agent and flow control agent are preferably a silicone compound, fluorinated silicone compound or the like.

The sol-gel material thus obtained is adhered between the substrate of the article and the mold, disposed in the form of a film and heated to produce an article having an uneven surface, coated with a gelled film having a surface shape which is the inversion of the surface shape of the mold. A typical method of forming this film having a fine uneven surface is as follows.

The method of forming a gelled film comprises applying a film-forming solution by coating such as spin coating, dip coating, screen printing, gravure coating, flexographic printing or meniscus coating to form a film having a uniform thickness on the surface, heating, pressing a mold against the film on the surface of the substrate of an article when the liquid film obtains plasticity, heating as it is, transfer molding, releasing the mold and finally heating. That is, the surface to be coated of the substrate of the article is kept horizontal, and a liquid sol-gel material having a viscosity of 10 cP or less.is poured onto the substrate and spread over the substrate in the form of a film to a predetermined thickness by spin coating or dip coating (step 1). In this state, the material is kept at 60 to 80° C. for 10 to 120 minutes to carry out a dehydration polycondensation reaction (step 2). A mold having a fine uneven surface shape is pressed against the film-like sol-gel material and kept at a pressure of 0.5 to 120 kg/cm$^2$ and a temperature of 60 to 80° C. for 60 seconds to 60 minutes to almost complete the dehydration polycondensation reaction of the sol-gel material for gelation (step 3). By removing the mold, a polysiloxane film, a gelled film having an uneven surface shape which is the inversion of the uneven surface shape of the mold, is formed in such a manner that it is bonded to the surface of the substrate (step 4). This film is finally heated at 180 to 350° C. for 10 to 150 minutes to polycondense the residual silanol group of the polysiloxane film and evaporate water generated by polycondensation, thereby causing slightly the volume shrinkage in a thickness direction.of the film to form a fine film (step 5). An article having an uneven surface, coated with a film having a surface shape which is the inversion of the surface shape of the mold, is thus obtained. At least one of the steps 2 to 4 may be carried out under reduced pressure.

As for the above mold, for example, the flat surface of a glass substrate is etched precisely to form, for example, a concave mold having a target shape. A convex metal mother die can be produced by electroless plating and electrolytic plating using this as a master mold. A convex metal master mold can be produced by the above plating using the above concave mold as a mother die and further a concave metal mother die can be produced by the above plating using this master mold. These convex and concave mother dies can be used as molds. In the above plating, a metal such as nickel or chromium is preferably used.

The polysiloxane film in the present invention has a one or more mountain-like, sawtooth-like, circular or oval cross section. By changing the shape of this convex portion, various functions can be provided to the substrate. For example, the substrate can serve as a grating, plate microlens array or prism array by changing it to a fine uneven shape.

The thickness of this polysiloxane film (after final heating) is 0.5 μm to 5.0 mm in the terms of the average height of convex portions and concave portions of the film. When the thickness of the film is larger than 0.5 μm, the ratio of the minimum value $d_{min}$ (distance between the bottom of a concave portion of the uneven film and the substrate) to the maximum value $d_{max}$ (distance between the top of a convex portion of the uneven film and the substrate) is preferably 0.25 or more, that is, $d_{min}/d_{max} \geq 0.25$ to prevent the film from peeling off from the substrate and from cracking. When the ratio (minimum value/maximum value), of the minimum value to the maximum value of film thickness is smaller than 0.25, the film may peel off from the substrate at the interface or the film may crack at a portion where the film thickness is the smallest in the step of forming the film. $d_{max}$ and $d_{min}$ preferably satisfy all the following expression (1) to (3), more preferably all the following expressions (4) to (6).

$$0.5 \,\mu m \leq (d_{max} - d_{min}) \leq 1.5 \,\mu m \quad (1)$$

$$d_{max} \leq 5 \,\mu m \quad (2)$$

$$d_{min} \geq 0.5 \,\mu m \quad (3)$$

$$0.6 \,\mu m \leq (d_{max} - d_{min}) \leq 1.1 \,\mu m \quad (4)$$

$$d_{max} \leq 4 \,\mu m \quad (5)$$

$$d_{min} \leq 0.5 \,\mu m \quad (6)$$

When the above stock solution contains methyltrialkoxysilane as the component (A) and the component (B) in an amount of 0.05 to 0.5 mol based on 1 mol of the component (A), the uneven film of the obtained article having an uneven surface contains a methylsilyl group (D) represented by the following chemical formula (4) and a siloxy group (E) represented by the following chemical formula (5) in a (D)/(E) molar ratio of 2/1 to 20/1.

$$CH_3SiO_{3/2} \quad (4)$$

$$SiO_{4/2} \quad (5)$$

According to the present invention, a single-layer film of organopolysiloxane having a heat resistance of 350° C., a thickness of 0.5 to 5 μm, a refractive index of 1.440 to 1.460 which is close to the refractive index of general glass and a fine uneven shape is formed on the substrate of the article. The organopolysiloxane constituting this film contains an alkyl group such as a methyl group in an amount of 11 to 21 wt %. Since this film has high adhesion to the substrate and high strength, the film hardly cracks. Foaming at the time of molding is not observed in the interior of the film, whereby excellent transferability of a fine uneven shape on the surface of the film with high dimensional accuracy can be realized. In concrete terms, when a large number of convex portions having a height of 2 μm are formed, nonuniformity in height among the convex portions on the surface of the film is 0.2 μm or less. The deviation of the interval between the convex portions on the surface from that of the mold is below measurement accuracy (0.2 μm). As the article having an uneven surface of the present invention has excellent heat resistance, a diffraction grating produced by the present invention can also be used as a mold for forming a resin diffraction grating.

The substrate of the article used in the present invention may have any shape such as a flat plate-like, curved plate-like or rod-like shape. The substrate preferably has a warp (length of thermal deformation in a direction perpendicular to the surface of the substrate per unit length in the surface direction of the substrate) of the surface at 200° C. and 20° C. of ±5 μm or less per 1 cm. When the warp is beyond this range, the film may peel off from the substrate at the interface or may crack in the molding step. Therefore, it is preferred to select the material, size and shape of the substrate.

This substrate preferably has a linear expansion coefficient of $1.5 \times 10^{-5}$/° C. or less. When the linear expansion coefficient of the substrate is larger than $1.5 \times 10^{-5}$/° C., in the case of a plastic substrate having a high thermal expansion coefficient such as polypropylene (9 to $15 \times 10^{-5}$/° C.), the film may peel off from the substrate at the interface or may crack in the molding step of the organopolysiloxane film. Ordinary inorganic glass has a linear expansion coefficient of $1.5 \times 10^{-5}$/° C. or less. At least the surface of the substrate is preferably made from an oxide. When the surface of the substrate in contact with the organopolysiloxane film is not made from an oxide, adhesion strength tends to be small in the film formation step, whereby the film may peel off from the substrate at the interface. Preferred examples of the material of the substrate include oxide glasses such as silicate-based glass, boric acid-based glass and phosphoric acid-based glass, quartz, ceramics, metals, epoxy resins and glass fiber reinforced polystyrene. Although the polyorganopolysiloxane film is hardly bonded to a metal as it is, if the surface of the metal is treated with an oxidizing agent, the metal can be advantageously used as the substrate.

When a transparent body which transmits light having a desired wavelength, such as visible light, ultraviolet light or infrared light is used as the substrate in the present invention, the article having an uneven surface of the present invention can serve as a transmission optical element such as a diffraction grating (relief type diffraction grating or blazed diffraction grating), lens or prism. When a transparent or opaque body is used as the substrate, a metal (such as aluminum or silver) or dielectric film (such as magnesium fluoride or titanium oxide) is formed on the film to be used as a reflective optical element such as a reflective diffraction grating or Fresnel reflector, CM-ROM or other information recording medium.

When the article having an uneven surface of the present invention is a diffraction grating, this diffraction grating can also be used as an integrated optical device if it is combined with another optical element. For example, it can be used as a wavelength separation optical element in a wavelength monitor module for optical communication, particularly high-density multiplexing/multi-separation. The high-density wavelength dividing and multiplexing (DWDM) technology is a very important technology for transmitting a plurality of signals over a single optical path at the same time because it can increase communication capacity without boosting costs optical fiber systems. That is, the capacity of a system can be expanded by increasing the number of communication channels to be carried by an optical fiber. The signals used for optical communication are light having a wavelength of 1.55 μm and light having a wavelength of 1.3 μm. A diffraction grating which is capable of diffracting the light having these wavelengths at a high efficiency and has excellent wavelength separation ability is preferably used. As the diffraction optical element produced by the process of the present invention has excellent heat resistance and environmental resistance, it is preferably used as an optical micro-element which requires high accuracy. When the diffraction grating of the present invention is used as a wavelength monitor module for high-density multiplexing/multi-separation, it is used in conjunction with an optical fiber, collimator lens or photosensitive semiconductor element. By inserting a polarizing filter or polarization converter between a collimator lens and a diffraction grating, an integrated optical element having improved polarization characteristics can be produced. An array of microlenses may be disposed between a collimator lens and an array of photosensitive semiconductor elements in such a manner that it is in contact with the array of photosensitive semiconductor elements. This array of microlenses is marketed under the trade name of PML by NSG America, Inc. By using this lens, the adjacent crosstalk of the array of photosensitive semiconductor elements can be reduced.

EMBODIMENT OF THE INVENTION

An embodiment of the present invention will be described in detail hereinafter.

The production process of the present invention is carried out by the following steps (1), (2), (3) and (4) sequentially: (1) preparation of an organopolysiloxane coating solution, (2) application of the coating solution to a substrate and heat treatment, (3) bonding, heat treatment and mold release, and (4) final heating (baking).

Preparation of Coating Solutions for Forming a Film (Solutions A1, A2, A3, A4, A5 and A6):

0.09 mol (16.0 g) of methyltriethoxysilane and 0.01 mol (2.08 g) of tetraethoxysilane were charged into a beaker and stirred. 0.1 mol of ethanol was added to this solution and stirred, and an aqueous solution containing 0.1 wt % of formic acid dissolved in 0.4 mol (7.3 g) of water was further added to this and stirred for 0.5 hour (solution A1). This solution was heated at 40° C. in an oven for 1 hour (solution A2). This was left to stand at room temperature for one night (solution A3). This was further left to stand at room temperature for another 6 days (solution A4).

0.08 mol (14.3 g) of methyltriethoxysilane and 0.02 mol (4.16 g) of tetraethoxysulane were charged into a beaker and stirred. 0.1 mol of ethanol was added to this solution and stirred, an aqueous solution containing 0.1 wt % of formic acid dissolved in 0.4 mol (7.3 g) of water was further added to this and stirred for 0.5 hour, and the resulting solution was heated at 40° C. in an oven for 1 hour (solution A5). This was left to stand at room temperature for one night (solution A6).

Preparation of Coating Solutions for Forming a Film (Solutions B1, B2, B3 and B4):

0.09 mol (16.0 g) of methyltriethoxysilane and 0.01 mol (2.08 g) of tetraethoxysilane were charged into a beaker and stirred. 0.1 mol of ethanol was added to this solution and stirred, and an aqueous solution containing 0.1 wt % of hydrochloric acid dissolved in 0.4 mol (7.3 g) of water was further added to this and stirred for 0.5 hour (solution B1). This was left to stand at room temperature for 6 days (solution B2).

0.09 mol of methyltriethoxysilane and 0.01 mol of tetraethoxysilane were charged into a beaker and stirred. 0.4 mol of ethanol was added to this solution and stirred, and an aqueous solution containing 0.1 wt % of hydrochloric acid dissolved in 0.4 mol (7.3 g) of water was further added to this and stirred for 0.5 hour (solution B3). This was left to stand at room temperature for 6 days (solution B4).

Preparation of Coating Solutions for Forming a Film (Solutions C1, C2, C3 and C4):

0.09 mol of methyltriethoxysilane and 0.01 mol of Ethyl Silicate 40 (condensate was calculated in terms of tetraethoxysilane (1.53 g of tetraethoxysilane)) were charged into a beaker and stirred. 0.1 mol of ethanol was added to this solution and stirred, and an aqueous solution containing 0.1 wt % of formic acid dissolved in 0.4 mol (7.3 g) of water was further added to this and stirred for 0.5 hour (solution C1). The resulting solution was heated at 40° C. in an oven for 1 hour (solution C2). This was left to stand at room temperature for 1 night (solution C3). This was further left to stand at room temperature for 2 days (solution C4).

Preparation of Coating Solutions for Forming a Film (Solutions D1, D2, D3 and D4):

0.01 mol (2.08 g) of tetraethoxysilane was charged into a beaker, 0.1 mol of ethanol was added to this solution and stirred, and an aqueous solution containing 0.1 wt % of formic acid dissolved in 0.4 mol (7.3 g) of water was further added to this and stirred at 60° C. for 0.5 hour. 0.09 mol (16.0 g) of methyltriethoxysilane was added to this solution and heated at 40° C. in an oven for 1 hour (solution D1). This was left to stand at room temperature for one night (solution D2). This was further left to stand at room temperature for 2 days (solution D3). This was still further left to stand at room temperature for 3 days (solution D4).

Preparation of Coating Solution for Forming a Film (Solution E1):.

10 0.09:mol (16.0 g) of methyltriethoxysilane was charged into a beaker and stirred. 0.1 mol of ethanol was added to this solution and stirred, and an aqueous solution containing 0.1 wt % of formic acid dissolved in 0.4 mol (7.3 g) of water was further added to this and stirred at 60° C. for 0.5 hour. 0.01 mol (2.08 g) of tetraethoxysilane was added to this solution and heated at 40° C. in an oven for 1 hour (solution E1).

Preparation of Coating Solution for Forming a Film (Solution F1):

0.05 mol (12.02 g) of phenyltriethoxysilane and 0.05 mol (10.4 g) of tetraethoxysilane were charged into a beaker and stirred. 0.1 mol of ethanol was added to this solution and stirred, and an aqueous solution containing 0.1 wt % of formic acid dissolved in 0.4 mol (7.3 g) of water was further added to this and stirred for 0.5 hour. The resulting solution was heated at 40° C. in an oven for 1 hour (solution F1).

The amounts of unhydrolysates contained in each of the above solutions A1 to A6, B1 to B4, C1 to C4, D1 to D4, E1 and F1 were measured to calculate the amounts of the silane compounds (A) and (B) which were not hydrolyzed and remained in the solution as they were based on the numbers of mols of the silane compound (A) (methyltriethoxysilane, phenyltriethoxysilane) and the silane compound (B) (tetraethoxysilane, "Ethyl Silicate 40") contained in the raw material solution to obtain amounts of unhydrolysates (%). The above silane compounds (A) and (B) which were not hydrolyzed and remained as they were denote silane compounds having a plurality of hydrolyzable groups of which were not hydrolyzed and exclude silane compounds having one of hydrolyzable groups of which was hydrolyzed. The amounts of unhydrolysates were measured by gas chromatography. The molecular weight of the condensate of the film-forming coating solution was calculated by gel permeation chromatography as weight average molecular weight in terms of polystyrene by drawing the calibration curve of polystyrene whose molecular weight is known.

Application of Solution to Substrate, Pressing and Heat Treatment:

Each of the above film-forming coating solutions was applied to a quartz glass substrate by spin coating and dried on a hot plate heated at 60° C. for 20 minutes, and a mold was pressed against the dried gelled film at a pressure of 2 kg/cm$^2$ and heated under reduced pressure at 60° C. for 30 minutes. Thereafter, the mold was released. As a result, a plate having a fine uneven surface which was the inversion of the surface of the mold was obtained.

Final Heating:

The plate having a fine uneven surface obtained by releasing the mold was heated at 350° C. for 15 minutes to obtain an article having an uneven surface.

The performance and characteristic properties of the obtained article having an uneven surface were evaluated by the following methods.

Measurement of Nonuniformity in Height Among Convex Portions:

Nonuniformity in height among convex portions of the outermost layer was measured by a laser microscope.

Measurement of Heat Resistance and Optical Properties:

After a heat resistance test was conducted on articles having an uneven surface produced in Examples and Comparative Examples by keeping them at 350° C. for 2 hours, the existence of cracks was checked by returning the temperature to room temperature to evaluate heat resistance. A He—Ne laser was used to measure the diffraction pattern of a diffraction grating before and after the heat resistance test for evaluation.

EXAMPLE 1

Figure 1:
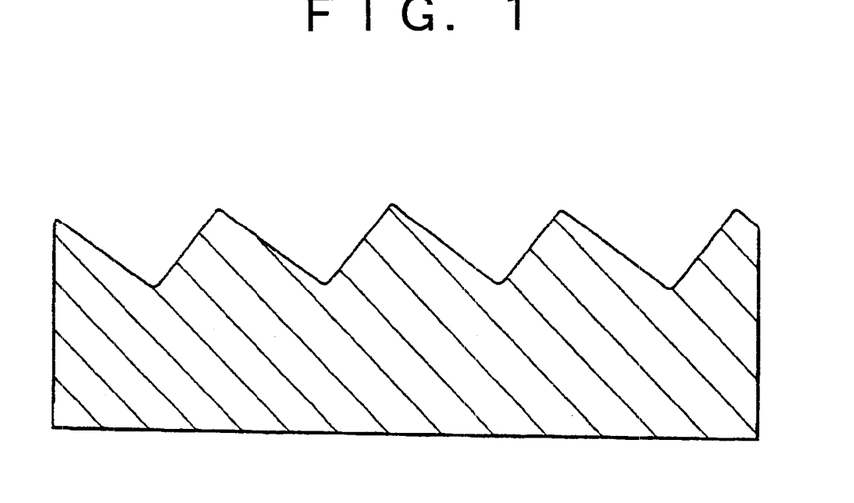
FIG. 1 is a sectional view showing the shape of a groove in a mold used in an Embodiment of the present invention.

A 2.5 cm square quartz glass substrate (linear expansion coefficient of $1.0 \times 10^{-5}/°C.$) having a thickness of 3.0 mm was prepared as a glass substrate. A resin blazed diffraction grating (pitch of 1.1 $\mu$m, groove depth of 0.8 $\mu$m, saw-toothed, Cr/Au coating film formed on the surface, average thickness of about 50 $\mu$m) was prepared as a mold. The sectional form of the groove is shown in FIG. 1. The above silane compounds (A) and (B) which were not hydrolyzed and remained in the film-forming coating solution A2 used and the molecular weight of a condensate contained in the coating solution A2 are shown in Table 1. 0.5 ml of the film-forming coating solution A2 was dropped onto the substrate and applied by spin coating at a revolution speed of 500 rpm. This was dried on a hot plate heated at 60° C. for 15 minutes, and the above mold was pressed against the sol-gel material and kept at a pressure of 50 kg/cm² and a temperature of 60° C. for 90 minutes. The mold was then removed by returning the pressure to normal pressure. The substrate was finally heated at 350° C. for 20 minutes to obtain a blazed diffraction grating having an uneven organopolysiloxane film having a surface shape which was the inversion of the surface shape of the mold formed on the quartz glass substrate. This uneven organopolysiloxane film contained the methylsilyl group (D) represented by the above chemical formula (4) and the siloxy group (E) represented by the above chemical formula (5) in a (D)/(E) molar ratio of 9/1.

TABLE 1

| Example | coating solution | catalyst | amounts of unhydrolysates (%) silane compounds (A) | (B) | molecular weight |
|---|---|---|---|---|---|
| Ex.1 | A2 | formic acid | 20 | 50 | 700 |
| Ex.2 | A3 | formic acid | 2 | 10 | 1000 |
| Ex.3 | C1 | formic acid | 15 | 55 | 1300 |
| Ex.4 | C2 | formic acid | 10 | 40 | 1450 |
| Ex.5 | C3 | formic acid | 5 | 22 | 1500 |
| Ex.6 | C4 | formic acid | 1 | 5 | 1600 |
| Ex.7 | D1 | formic acid | 23 | 8 | 1000 |
| Ex.8 | D2 | formic acid | 5 | 6 | 1200 |
| Ex.9 | D3 | formic acid | 2 | 5 | 1400 |
| Ex.10 | D4 | formic acid | 1 | 3 | 1400 |
| Ex.11 | A5 | formic acid | 20 | 50 | 700 |
| Ex.12 | A6 | formic acid | 2 | 10 | 1000 |
| Ex.13 | F1 | formic acid | 3 | 10 | 1500 |
| C.Ex.1 | A1 | formic acid | 65 | 85 | <300 |
| C.Ex.2 | A4 | formic acid | 0.0 | 0.0 | 2000 |
| C.Ex.3 | B1 | hydrochloric acid | 0.0 | 0.0 | 2100 |
| C.Ex.4 | B2 | hydrochloric acid | 0.0 | 0.0 | 2300 |
| C.Ex.5 | B3 | hydrochloric acid | 0.0 | 0.0 | 2600 |
| C.Ex.6 | B4 | hydrochloric acid | 0.0 | 0.0 | 3000 |
| C.Ex.7 | E1 | formic acid | 0.0 | 95 | 1000 |

Ex.: Example
C.Ex.: Comparative Example

The organopolysiloxane film formed as described above was transparent and had a thickness ($d_{max}$) of 3.0 $\mu$m at convex portions. The thickness of the film at concave portions ($d_{min}$) was 2.2 $\mu$m. $d_{max}$ and $d_{min}$ satisfy the above expressions (4), (5) and (6) as follows.

$$0.6 \ \mu m \leq (d_{max} - d_{min} = 0.8 \ \mu m) \leq 1.1 \ \mu m$$

$$(d_{max} = 3.0 \ \mu m) \leq 4.0 \ \mu m$$

$$(d_{min} = 2.2 \ \mu m) \geq 0.5 \ \mu m.$$

The film-forming coating solution A2 dropped onto the substrate for spin coating was not cissed as shown in Table 2. When the mold was removed, as shown in Table 2, the film did not peel off. When heat resistance evaluation (350° C. heating and quenching test) was made on this diffraction grating, as shown in Table 2, the film did not crack and there was no change in appearance, the height of convex portions of the film and a standard deviation thereof, and the diffraction pattern before and after the heat resistance test.

TABLE 2

| Example | coating solution No. | spin coating | press molding | 350° C. heating and quenching test |
|---|---|---|---|---|
| Ex.1 | A2 | solution was not cissed | film did not peel off | film did not crack |
| Ex.2 | A3 | solution was not cissed | film did not peel off | film did not crack |
| Ex.3 | C1 | solution was not cissed | film did not peel off | film did not crack |
| Ex.4 | C2 | solution was not cissed | film did not peel off | film did not crack |
| Ex.5 | C3 | solution was not cissed | film did not peel off | film did not crack |
| Ex.6 | C4 | solution was not cissed | film did not peel off | film did not crack |
| Ex.7 | D1 | solution was not cissed | film did not peel off | film did not crack |
| Ex.8 | D2 | solution was not cissed | film did not peel off | film did not crack |
| Ex.9 | D3 | solution was not cissed | film did not peel off | film did not crack |
| Ex.10 | D4 | solution was not cissed | film did not peel off | film did not crack |
| Ex.11 | A5 | solution was not cissed | film did not peel off | film did not crack |
| Ex.12 | A6 | solution was not cissed | film did not peel off | film did not crack |

TABLE 2-continued

| Example | coating solution No. | spin coating | press molding | 350° C. heating and quenching test |
| --- | --- | --- | --- | --- |
| Ex.13 | F1 | solution was not cissed | film did not peel off | film did not crack |
| C.Ex.1 | A1 | solution was cissed | film did not peel off | film cracked |
| C.Ex.2 | A4 | solution was not cissed | film peeled off | evaluation impossible |
| C.Ex.3 | B1 | solution was not cissed | film peeled off | evaluation impossible |
| C.Ex.4 | B2 | solution was not cissed | film peeled off | evaluation impossible |
| C.Ex.5 | B3 | solution was not cissed | film peeled off | evaluation impossible |
| C.Ex.6 | B4 | solution was not cissed | film peeled off | film cracked |
| C.Ex.7 | E1 | solution was cissed | film peeled off | evaluation impossible |

Ex.: Example
C.Ex.: Comparative Example

EXAMPLES 2 to 13

The procedure of Example 1 was repeated except that each of the film-forming coating solutions A3, A5, A6, C1 to C4, D1 to D4 and F1 was used in place of the film-forming coating solution A2 used in Example 1. The amounts of the above silane compounds (A) and (B) which were not hydrolyzed and remained in each of the film-forming coating solutions as they are and the molecular weight of a condensate contained in the coating solution are shown in Table 1. As for the cissing of the solution at the time of spin coating, the peeling off of the film at the time of press molding and the heat resistance of a diffraction grating, as shown in Table 2, the solution was not cissed, the film did not peel off, the heat resistance was satisfactory, and there was no change in appearance, the height of convex portions of the film and a standard deviation thereof, and the diffraction pattern before and after the heat resistance test as in Example 1.

EXAMPLE 14

Figure 2:
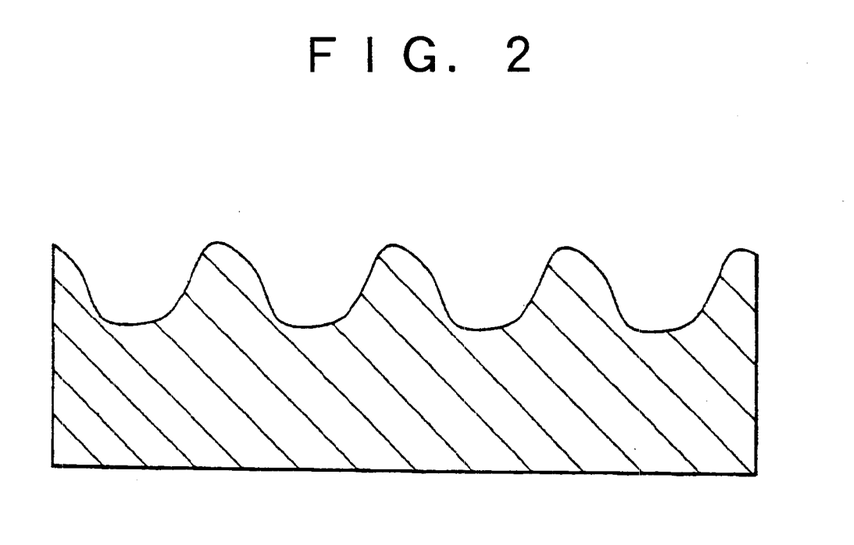
FIG. 2 is a sectional view showing the shape of a groove in a mold used in another Embodiment of the present invention.

A resin blazed diffraction grating having a groove sectional form shown in FIG. 2 was prepared (pitch of 1.1 μm, groove depth of 0.8 μm, the sectional form of a sawtooth-like groove consisted of continuous curved surfaces, the bottom of each concave portion had a flat portion of about 0.3 μm in width, a Cr/Au coating film formed on the surface, average thickness of about 50 μm). An article having an uneven surface was obtained by coating a substrate with a solution, pressing and carrying out a heat treatment and final heating in the same manner as in Example 1 except that a resin blazed diffraction grating shown in FIG. 2 was used in place of the resin blazed diffraction grating used as the mold in Example 1 and the coating solution A5 was used in place of the film-forming coating solution A2 used in Example 1. Since the sectional form of the used mold had more curved surfaces than the mold of Example 1 and had a flat potion at the bottom of the concave portion, the mold releasing work was easy. When the heat resistance and optical properties of the obtained article having an uneven surface were measured in the same manner as in Example 1, the film did not crack and there was no change in appearance, the height of the convex portions of the film and a standard deviation thereof, and the diffraction pattern before and after the heat resistance test.

COMPARATIVE EXAMPLES 1 to 7

Plates having a fine uneven surface were formed using the same substrate and mold as in Example 1 in the same manner as in Example 1 except that the film-forming coating solutions A1, A4, B1 to B4 and E1 were used in place of the film-forming coating solution A2 used in Example 1. The amounts of the above silane compounds (A) and (B) which were not hydrolyzed and remained in each of the above film-forming coating solutions as they were and the molecular weight of a condensate contained in the coating solution are shown in Table 1. The cissing of the solution at the time of spin coating, the peeling off of the film at the time of press molding and the heat resistance of the diffraction grating are shown in Table 2.

As shown in Table 2, the solution was cissed at the time of spin coating in Comparative Examples 1 and 7 and the film peeled off at the time of press molding in Comparative Examples 2 to 6. The film was cracked by cooling in a heat resistance test in Comparative Examples 1 and 6, whereby part of the film peeled off and the evaluation of unevenness could not be carried out. When the heat resistance of the substrate was evaluated, the crack in the film further expanded and then the film partly peeled off. Therefore, the height of convex portions of the film and a standard deviation thereof after the heat resistance test could not be measured and there was a great change in the diffraction pattern before and after the heat resistance test. In Comparative Examples 2 to 5 and 7, the film strongly adhered to the mold and the mold releasing work took much time and labor. Most of the film after the mold releasing adhered to the mold and the film rarely remained on the glass substrate. Therefore, subsequent evaluation could not be made.

EXAMPLE 15

A wavelength monitor module for a wavelength dividing and multiplexing communication system was fabricated using the diffraction grating obtained in Example 1 and having a 5 nm thick aluminum film formed on the surface by sputtering. Optical elements such as an optical fiber array, collimator lens and the diffraction grating of the present invention were arranged in the order named. The collimator lens was disposed such that the fiber array was situated on the plane of its focusing point. Optical signals from the optical fiber array which were multiplexed on 16 channels were converted into parallel light rays by the collimator lens which were then irradiated onto the surface of the diffraction grating. This irradiated light was divided to be maltiple into diffraction angles corresponding to the wavelengths of 16 channels and reflected on the surface of the diffraction grating which was disposed at such an angle that light having a wavelength of 1.55 μm was selectively blazed. This reflected and diffracted light was converged on 16 photo-sensitive semiconductor elements arranged for respective channels through the collimator lens. The insertion loss of incident light was 5 dB and crosstalk between adjacent channels was 15 dB. Thus, the diffraction grating fully served as a wavelength monitor module optical integrated element for a wavelength dividing and multiplexing communication system. The insertion loss value and the crosstalk value did not change greatly at a temperature range of 0 to 85° C.

According to the present invention, there can be provided an optical element which has few defects caused by the cissing of a solution at the time of coating, rarely experiences the cracking of a gelled film at the time of forming the film, contains an appropriate amount of the residual alkyl group such as methyl group in the film, has excellent film elasticity (less fragile), high film strength and hardly experiences the cracking of the film and other article having an uneven surface.

What is claimed is:

1. A process for producing an article having an uneven surface, comprising disposing a film-forming solution between a substrate and a mold in the form of a film so as to make the solution closely contact with the substrate and the mold, said solution being prepared by carrying out the hydrolysis and dehydration condensation reaction of a stock solution containing a silane compound (A) represented by the following chemical formula (1):

$$RSiX_3 \qquad (1)$$

wherein R is a non-hydrolyzable organic group and X is a hydrolyzable group, a silane compound (B) represented by the following chemical-formula (2):

$$SiX'_4 \qquad (2)$$

wherein X' is a hydrolyzable group, and an organic acid catalyst, and heating to form an article having an uneven film having a surface shape which is the inversion of the surface shape of the mold on the surface of the substrate, wherein the film-forming solution contains the silane compounds (A) and (B) in the form of unhydrolysates in amounts of 0.5 to 40 wt % and 0.5 to 60 wt % based on the amount of the silane compound (A) and the amount of the silane compound (B) contained in the stock solution, respectively, and the condensate produced by the dehydration condensation reaction in the film-forming solution has a weight average molecular weight of 300 to 1,900 and wherein the stock solution contains the components (A) and (B) in an (B)/(A) molar ratio of 0.05/1 to 1/1.

2. The process of claim 1, wherein the organic acid is formic acid.

3. The process of claim 1, wherein the stock solution contains the above components (A) and (B), alcohol, water and catalyst, and the above film-forming solution is prepared by hydrolyzing the stock solution under agitation and carrying out the dehydration polycondensation reaction of the stock solution by heating.

4. The process of claim 1, wherein the above stock solution is obtained by substituting part or all of the component (B) by (C) a silane compound represented by the following chemical formula (3):

wherein X″ is an alkoxyl group or halogen atom to be hydrolyzed, and n is and integer of 1 to 10, in a (C)/(B) molar ratio of [1/(n+1)]/1.

5. The process of claim 4, wherein the above component (C) is a silane compound of the above formula (3) in which X″ is an alkoxyl group.

6. The process of claim 1, wherein X in the formula (1) of the component (A) and X' in the formula (2) of the component (B) are both an alkoxyl group.

7. The process of claim 1, wherein the above component (A) is methyltriethoxysilane and the above component (B) is tetraethoxysilane.

8. An article having an uneven surface produced by the process of claim 1.

9. The article of claim 8, wherein the uneven film has the maximum thickness $d_{max}$ (distance between the top of a convex portion of the uneven film and the substrate) and the minimum thickness $d_{min}$ (distance between the bottom of a concave portion of the uneven film and the substrate) which satisfy all the following expressions (1) to (3):

$$0.5 \ \mu m \leq (d_{max} - d_{min}) \leq 1.5 \ \mu m \qquad (1)$$

$$d_{max} \leq 5 \ \mu m \qquad (2)$$

$$d_{min} \geq 0.5 \ \mu m \qquad (3).$$

10. The article of claim 8, wherein the above uneven film has the maximum thickness $d_{max}$ (distance between the top of a convex portion of the uneven film and the substrate) and the minimum thickness $d_{min}$ (distance between the bottom of a concave portion of the uneven film and the substrate) which satisfy all the following expressions (4) to (6):

$$0.6 \ \mu m \leq (d_{max} - d_{min}) \leq 1.1 \ \mu m \qquad (4)$$

$$d_{max} 23 \ 4 \ \mu m \qquad (5)$$

$$d_{min} \geq 0.5 \ \mu m \qquad (6).$$

11. The article of claim 8, wherein the uneven film contains a methylsilyl group (D) represented by the following chemical formula (4):

$$CH_3SiO_{3/2} \qquad (4)$$

and a siloxy group (E) represented by the following chemical formula (5):

$$SiO_{4/2} \qquad (5)$$

in an (D)/(E) molar ratio of 2/1 to 20/1.

12. The article of claim 8 which is a relief diffraction grating.

13. The article of claim 8 which is a blazed diffraction grating.

14. A wavelength monitor for a wavelength dividing and multiplexing communication system which comprises the relief diffraction grating of claim 12.

15. A wavelength monitor for a wavelength dividing and multiplexing communication system which comprises the blazed diffraction grating of claim 13.

* * * * *